July 22, 1930.  J. L. RICE  1,771,061
REAR VISION MIRROR
Filed Dec. 13, 1927
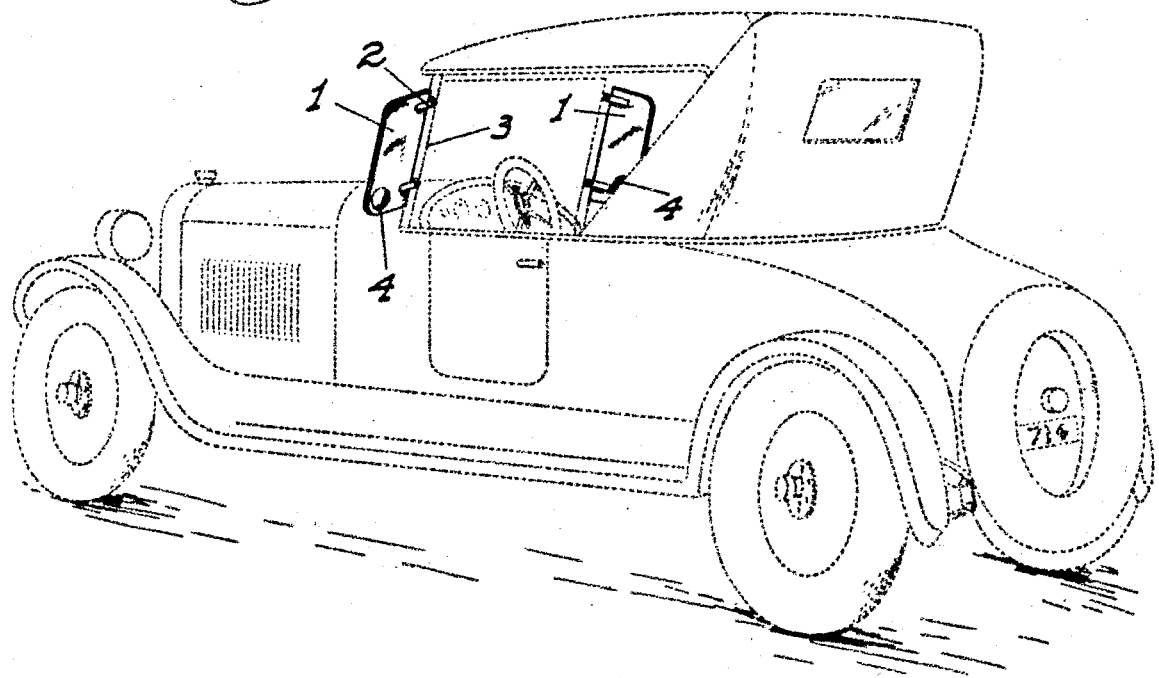
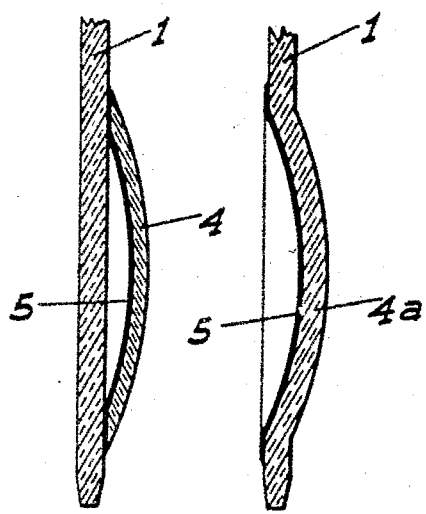
INVENTOR
J. L. Rice
BY
ATTORNEY Patented July 22, 1930

1,771,061

UNITED STATES PATENT OFFICE

JAMES L. RICE, OF LOS ANGELES, CALIFORNIA

REAR-VISION MIRROR

Application filed December 13, 1927. Serial No. 239,673.

This invention relates to automobile accessories and particularly to rear vision mirrors.

The principal object of my invention is to provide as a single unit a wind shield wing having a rear vision mirror formed thereon or directly attached thereto. This device would have, therefore, particular value for use on open cars in which such wings are counted as almost a necessity and in which the back curtain windows are sometimes so small that it is hard to locate an interior rear vision mirror so as to be effective.

A further object is to arrange the mirror so that proper reflection therefrom will not be impaired when the angle of setting of the wings is altered and no corresponding adjustment of the mirror is necessary with any such adjustment of the wing.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective outline of a motor vehicle showing my combined wing and mirror attachment.

Fig. 2 is an enlarged fragmentary section of a wing taken through the mirror.

Fig. 3 is a similar view showing a modified method of forming the mirror.

Referring now more particularly to the numerals of reference on the drawings, and particularly at present to Figs. 1 to 3, 1 denotes the wind shield wings which as usual are flat plate glass panels of suitable size having brackets 2 for attachment to the frame 3 of the wind shield of the car.

Disposed in each wing adjacent its lower and outer edge is the mirror 4. This mirror is of circular form and is convex relative to the rear face of the wing. It may be made as an element separate from and cemented onto the wing as shown in Fig. 2, or made integral therewith. This is done by forming the wing during its manufacture with a depression on one side to give a bulge of the desired size on the other side as shown at 4ª in Fig. 3.

The mirror effect from the convex portion is of course obtained by placing a layer of reflecting metal 5 as usual on the concave front face of the mirror area as shown.

By reason of this construction it will be seen that in either case the convex or outer surface of the mirror has a reflecting area concentric with and practically equal to the area of said convex surface. The reflection therefore from any point of the mirrored surface will be equal throughout and will not be distorted in any way.

The mirror is preferably mounted in both wings and by reason of the particular shape employed it will be evident that adequate and enlarged reflection from the rear will be obtained by the driver of the car regardless of any adjustment or setting of the wings.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A windshield wing comprising a transparent and mainly flat-surfaced body, said body being formed with a spherically curved portion projecting convexedly from its rear surface, the front face of the body being concavely curved concentric with said convexly curved portion and the thickness of the body between said curved portions being such that the area of the concave surface is substantially the same as that of the convex portion, and a metallic reflecting coating over said concave surface.

2. A windshield wing comprising a transparent and mainly flat surfaced body, said body having a spherically curved element projecting convexedly from its rear surface, the front face of said element being concavely curved concentric with the convexly curved surface and of substantially the same area, and a metallic reflecting coating over said concave surface.

In testimony whereof I affix my signature.
JAMES L. RICE.